April 1, 1924.

H. J. FRANKLIN

TIRE COVERING

Filed May 23, 1923

1,488,809

Inventor
Henry J. Franklin.

By Harry C. Schroeder
Attorney

UNITED STATES PATENT OFFICE.

HENRY J. FRANKLIN, OF BERKELEY, CALIFORNIA.

TIRE COVERING.

Application filed May 23, 1923. Serial No. 640,860.

*To all whom it may concern:*

Be it known that I, HENRY J. FRANKLIN, a citizen of the United States, residing at Berkeley, in the county of Alameda and State of California, have invented certain new and useful Improvements in Tire Coverings, of which the following is a specification.

My invention is an improved protective covering and safety device for pneumatic tires.

The object of my invention is to provide a protective covering which may be readily attached to the tires.

Another object of my covering is to prevent skidding of the vehicle. This is accomplished by forming the covering of a plurality of transversely positioned cord strands.

Further objects will be more fully pointed out and explained in the following specification.

Figure 1:
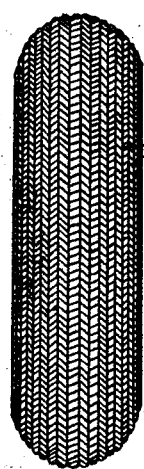
Figure 2:
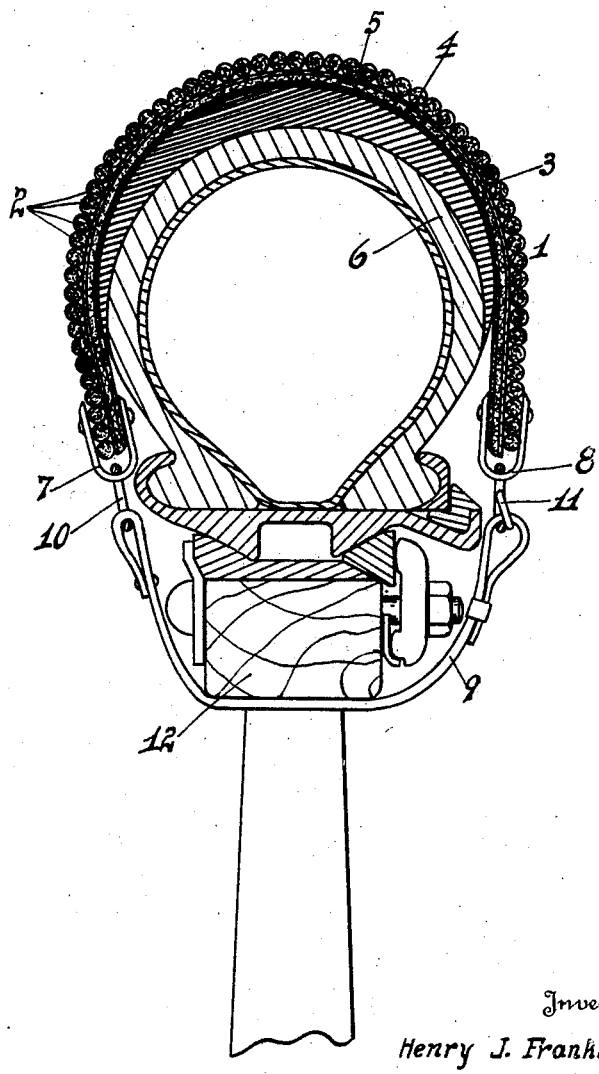

In the annexed drawing in which my invention is illustrated:

Figure 1 is a side view of my covering. Figure 2 is a transverse sectional view of the same in position on a wheel.

Referring more particularly to the drawing, my outer tread 1 is formed of a plurality of interwoven cord strands 2, which strands are formed of a tough fibre such as hemp. The cords 2 are braided together to form a rough outer surface, which will tenaciously grip a wet or slippery road and prevent skidding.

A metal shoe 3 is positioned under the tread 1 to prevent the tire from being punctured. A felt pad 4 is placed under the shoe 3 and a canvas strip 5 is placed under the pad 4 and against the tire 6. The strip 5 and pad 4 prevent the metal shoe 3 from chafing the rubber tire 6.

The tread 2, shoe 3, pad 4 and strip 5 are all held together at their edges by a plurality of links 7 and 8. My covering is secured to the tire 6 by a plurality of strips 9 which are secured to the link 7 by a ring 10, and to the link 8 by a buckle 11 which passes under the felly 12. The buckle 11 permits the cover to be drawn over the tire to the desired tension.

Having described my invention, I claim:

1. A tire covering comprising a cord tread, a metal shoe under said tread and means to secure said shoe and said tread to the tire.

2. A tire covering comprising a cord tread, a metal shoe under said tread, a felt pad under said shoe, and means to secure said cover to the tire.

3. A tire covering comprising an outer cord tread, a metal shoe under said tread, a felt pad under said shoe, a canvas strip under said felt pad, and means to secure said cover to the tire.

4. A tire covering comprising an outer cord tread, a metal shoe under said tread, a felt pad under said shoe, a canvas strip under said felt pad, a plurality of straps secured at one end to said covering, and adapted to encircle the wheel felly, and means to secure the other end of said straps to the covering.

In testimony whereof I affix my signature.

HENRY J. FRANKLIN.